R. L. WEBSTER.
HAY PULLER.
APPLICATION FILED SEPT. 19, 1916.
1,291,308.
Patented Jan. 14, 1919.
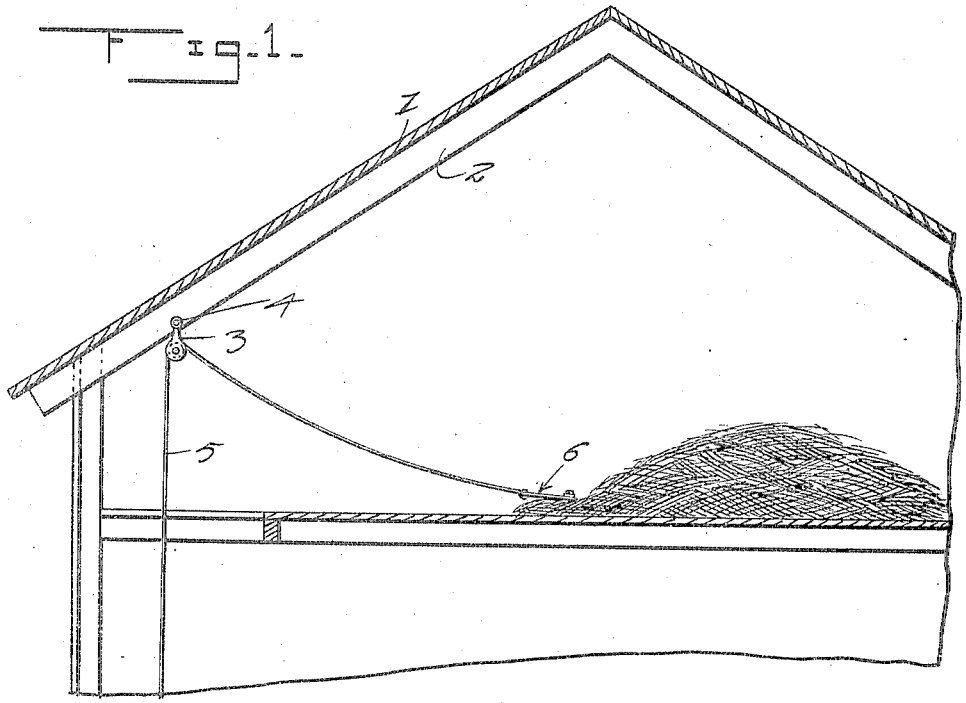
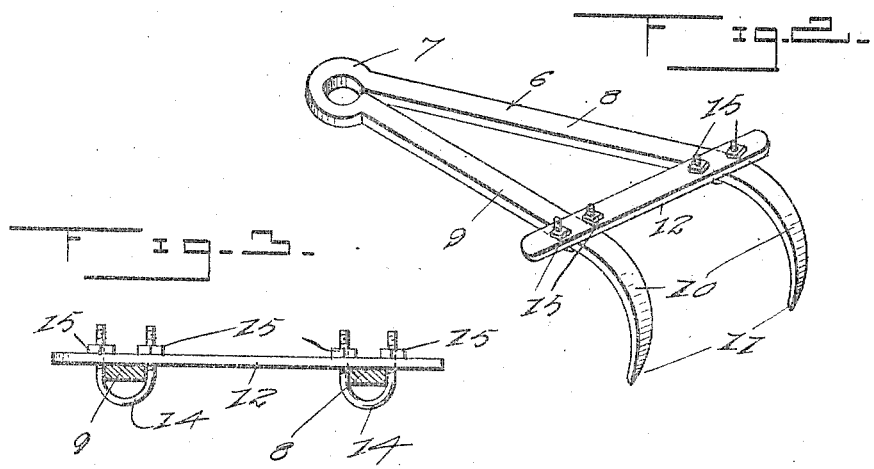
Witness
Inventor
R. L. Webster,
By ........ Attorney

UNITED STATES PATENT OFFICE.

ROBERT L. WEBSTER, OF ANTIGO, WISCONSIN.

HAY-PULLER.

1,291,308.  Specification of Letters Patent.  Patented Jan. 14, 1919.

Application filed September 19, 1916. Serial No. 121,003.

*To all whom it may concern:*

Be it known that I, ROBERT L. WEBSTER, a citizen of the United States, residing at Antigo, in the county of Langlade and State of Wisconsin, have invented certain new and useful Improvements in Hay-Pullers; and I do hereby declare the following to be a full, clear, and exact description of the invention, such as will enable others skilled in the art to which it appertains to make and use the same.

This invention relates to a device which is particularly designed for spreading hay in a mow or for pulling bunches of hay from one position to another.

The primary object of this invention is to provide a hay hook or puller which is constructed of a piece of bar iron bent to form substantially a V-shape, having an eye at the apex of the same to which a rope, cable or the like may be attached and having the free ends of the legs curved downwardly and sharpened for insertion into a bunch of hay and to attach a rope to the eye of the hook or puller, to which rope a team of draft animals may be hitched for the purpose of spreading hay in a mow, or pulling bunches of hay from one position to another, and materially decreasing the amount of manual labor contingent with this type of work.

Another object of this invention is to provide a bar which is detachably attached to the legs of the hook or puller for holding them rigidly in their proper position.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which—

Figure 1 is a fragmentary section through a mow illustrating the application of the invention, Fig. 2 is a perspective view of the improved hay puller or hook and Fig. 3 is a cross section through the hook illustrating the bracing bar and the manner of attaching it to the legs of the hook or puller.

Referring more particularly to the drawing, 1 indicates an ordinary barn which has rafters 2 positioned inwardly of its roof, as is ordinary in the construction of barns and the upper portion of which barn forms a hay mow. One of the rafters 2 has a pulley block 3 detachably connected thereto as indicated at 4. A rope 5 passes over the pulley block 3 and is connected to a hay puller or hook generically indicated by the numeral 6.

The hay puller or hook 6 is composed of a single piece of bar iron which is bent substantially a V-shape, and is provided with an eye 7 formed at the apex thereof, or at the point of convergence of the arms 8 and 9 of the hook. The free ends of the arms 8 and 9 of the hay puller or hook 6 are curved downwardly as indicated at 10, and are sharpened to form points 11 which are adapted to be inserted into a bunch of hay as indicated in Fig. 1 of the drawing.

A bracing bar 12 is provided for holding the arms in their proper positions with respect to each other. The bar 12 is connected to the arms 8 and 9 through the medium of U-shaped bolts 14 which extend over the arms 8 and 9 and through the bar 12, having nuts 15 mounted thereon for clamping the bracing bar 12 in firm binding engagement with the upper surfaces of the arms 8 and 9 for holding these arms in their proper spaced relation.

The rope or cable 5 is attached to the hook or puller 6 through the eye 7. When hay is put into a mow by the usual type of hay fork, the bunches may be moved about in the mow, for proper mowing, or for spreading the hay by means of the improved hook or puller 6. When it is desired to move a bunch of hay, the curved pointed ends 10 are inserted into the hay, and a horse or team of horses are hitched to the rope 5, and by pulling on this rope, the hay may be moved to the desired locations, thereby eliminating the manual labor usually contingent with the moving of large bunches of hay.

The hook or puller may also be conveniently used in drawing hay from a stack to a baler, and the quantity of hay drawn at each pull or operation of the puller may be regulated by the depth of insertion of the curved ends 10 into the hay.

In reducing the invention to practice, certain minor features of construction, combination and arrangement of parts may necessitate alterations to which the patentee is entitled, provided such alterations are comprehended within the scope of what is claimed.

What is claimed is:—

A hay puller adapted for attachment to a source of power, comprising, a body portion formed of a metal bar bent intermediate its ends to form an eye and a pair of outwardly diverging arms, said arms having their end portions curved downwardly and pointed; and a brace bar adjustably arranged on the arms for holding them in spaced relation and varying the distance between the end portions thereof.

In testimony whereof I affix my signature in presence of two witnesses.

ROBERT L. WEBSTER.

Witnesses:
J. B. BUTROW,
L. CARLSON.